United States Patent [19]
Peck et al.

[11] Patent Number: 5,804,246
[45] Date of Patent: Sep. 8, 1998

[54] PROCESS FOR THE PRODUCTION OF COOKED MINCED MEAT-LIKE PRODUCT

[75] Inventors: Adrian Peck, Milton Keynes; Peter Fitch, Carlton, both of United Kingdom

[73] Assignee: Haldane Foods Ltd., Newport Pagnell, United Kingdom

[21] Appl. No.: 564,104

[22] PCT Filed: Jun. 15, 1994

[86] PCT No.: PCT/GB94/01293

§ 371 Date: Dec. 15, 1995

§ 102(e) Date: Dec. 15, 1995

[87] PCT Pub. No.: WO94/28738

PCT Pub. Date: Dec. 22, 1994

[30] Foreign Application Priority Data

Jun. 16, 1993 [GB] United Kingdom ............... 9312346

[51] Int. Cl.⁶ ......................................................... A23J 3/14
[52] U.S. Cl. ............................ 426/656; 426/516; 426/574; 426/615; 426/802
[58] Field of Search ...................................... 426/104, 574, 426/656, 516, 615, 802, 438

[56] References Cited

U.S. PATENT DOCUMENTS

| | | | |
|---|---|---|---|
| 3,197,310 | 7/1965 | Kjelson | 426/574 |
| 3,968,268 | 7/1976 | Sair et al. | 426/104 |
| 4,197,324 | 4/1980 | Ziminski et al. | 426/516 |
| 4,495,205 | 1/1985 | Brander et al. | 426/574 |

FOREIGN PATENT DOCUMENTS

| | | |
|---|---|---|
| 0003912 | 9/1979 | European Pat. Off. . |
| 0094112 | 11/1983 | European Pat. Off. . |
| 2391654 | 5/1978 | France . |
| 977239 | 12/1964 | United Kingdom . |
| 1429111 | 5/1976 | United Kingdom . |
| 2066644 | 7/1981 | United Kingdom . |

OTHER PUBLICATIONS

Patent Abstracts of Japan–vol. 014, No. 043 (C–0681) 26 Jan. 1990 & JP,A, 01 277 469.
Database WPI, Week 8412, Derwent Publications, Ltd., London, GB; An 84–071564 & JP, A, 59 025 649 (no date).
Patent Abstracts of Japan–vol. 012, No. 398 (C–0538) 21 Oct. 1988 & JP, A, 63 141 551.

*Primary Examiner*—Lien Tran
*Attorney, Agent, or Firm*—Salter & Michaelson

[57] ABSTRACT

A process for the production of minced meat like product includes the steps of: (a) blending together one or more vegetable proteins, one of which is wheat gluten, and water to produce a mixture; (b) imparting 5 to 22 watt hours kg to the mixture during the mixing to produce a sheet structure; (c) extruding the mixture through an aperture having a diameter in the range 2 mm to 100 mm to form an extrudate; and (d) setting that extrudate by heating to a temperature of at least 65° C.

9 Claims, No Drawings

PROCESS FOR THE PRODUCTION OF COOKED MINCED MEAT-LIKE PRODUCT

BACKGROUND OF THE INVENTION

The present invention relates to a cooked minced meat like product for use as a substitute or an extender.

The problem to be solved by the invention is to produce a product of acceptable taste and texture. Attempts to produce similar products have already been made. In JP-A-01277469, a food product is produced having along shelf life by a process involving extrusion, hydration and frying. This does not produce a product of the required taste and texture. In GB-2066644A a process and equipment are disclosed for producing a food product comprising a coherent body of fibres obtained by spinning proteins. The resultant product is intended to emulate a natural meat product. However, this product does not have the required taste and texture.

SUMMARY OF THE INVENTION

In general, the invention is directed to a process for the production of minced meat like product comprising the steps of: (a) blending together one or more vegetable proteins, one of which is wheat gluten, and water to produce a mixture; (b) imparting 5 to 22 watt hours kg to the mixture during the mixing to produce a sheet structure; (c) extruding the mixture through an aperture having a diameter in the range 2 mm to 100 mm to form an extrudate; and (d) setting that extrudate by heating to a temperature of at least 65° C.

DETAILED DESCRIPTION OF THE PREFERRED EMBODIMENT

According to one aspect of the present invention, there is provided a process for the production of minced meat like product comprising the steps of blending together one or more vegetable proteins, one of which is wheat gluten, and water to produce a mixture, imparting 5 to 22 watt hours kg to the mixture during the mixing to produce a sheet structure, extruding the mixture through an aperture having a diameter in the range 2 mm to 100 mm to form an extrudate, and setting that extrudate by heating to a temperature of at least 65° C. Preferably, the diameter of the aperture is in the range of 2.0 to 19 mm.

According to another aspect of the present invention, there is provided a product made by the above method comprising a minimum protein content of 49%, on a moisture and oil free basis, a minimum oil content of 5%, and a final moisture content between 15% and 80%.

A preferred embodiment of the product consists of a blend of gluten, textured vegetable protein, and water which results in a dough which is shaped and heat set without the use of additives being necessary.

Some properties of baking doughs are taken and adapted for a savoury application. A normal baking dough is typically based on wheat and water.

Wheat flour consists of 12–14% protein of which when hydrated 85% becomes gluten. The bulk of the rest of the flour is made up of carbohydrates in the form of starch granules (65–70%) and a small amount of sugar.

In accordance with a preferred feature of the invention, the carbohydrate fraction in the form of starch granules is substituted with a functional ingredient namely a vegetable protein.

The main events when a bread dough is produced are as follows. Firstly, an initial hydration of the damaged starch granules is effected. Secondly, the protein fraction hydrates to form discrete wedges, which by the end of the process have formed a 3-dimensional structure, which is primarily glutenin, in which swollen starch granules, and undamaged granules are embedded. In a yeast fermented dough, the carbon dioxide produced causes the gluten molecules to be stretched into linear chains which interact to form elastic sheets under the gas bubbles.

In a preferred embodiment of this invention, because a vegetable protein has been introduced in place of the starch granules, and because there is no carbon dioxide formation, the 3-dimensional formation is interrupted with hydrated textured vegetable protein.

In a bread dough the major proteins come from the gluten fraction of the flour. These are classified according to their solubility in a solvent and are known as glutenin and gliadin. The glutenins form the 3-dimensional structure and this is modified by the gliadins. Glutenins are associated with gluten elasticity and the gliadins with viscosity.

A further consideration is the interaction between any non-gluten proteins and gluten proteins. This type of interaction leads to compact highly resistant non-extensible units. In bread doughs these are regarded as undesirable. A good strong bread dough is regarded as being less viscous than elastic with not too much non-gluten protein, gluten protein interaction. However, in a preferred embodiment of this invention the starch granules are replaced by textured vegetable protein, thus these gluten protein, no-gluten protein interactions are positively encouraged. Therefore, the dough that is formed, in accordance with the invention, is more viscous than elastic.

The types of interaction are varied and complex due to the nature of the proteins present. They may be broadly described as covering the whole range of the possible interactions e.g. ionic, covalent, hydrogen bonding and Van der Waals forces.

In accordance with the invention the desired sheet structure that is formed when the mixture is worked for the desired amount of time is thought to be dominated by the glutenin.

In order to achieve the structure in the dough a number of mixing methods were investigated. Conventional ribbon and paddle mixers gave an adequate dough. Slightly less efficient was a conventional spiral dough mixer. Machines manufactured by Tweedy and Mono for "no-time" doughs form a very satisfactory dough structure.

The mixing and combining stages were also mimicked very well on a twin screw extruder.

An important element here is the energy input. A bread dough will normally require approximately 11 watt h/Kg. Between 5 and 22 watt h/Kg is imparted during the blending stage dependent upon mix size. The final temperature of the mix would be less than 75° C. Whereas with a baking dough overworking can result in reduced loaf volume, with the present invention the limiting factor is the ability to handle the dough during processing. Overworking is not as critical as regards the quality of the final product.

In line with the current climate of additive free foods, an important feature of the invention is that no additives are required to achieve the desired end product. Thus the final products are very suitable for application where meat and additive free food is a prime consideration.

The resulting dough is then shaped before a heating stage. This is preferably achieved by extruding through an aperture of between 2.0 and 100 mm advantageously 2.5 to 15 mm preferably 5 mm.

The heat setting of the dough is preferably done by allowing the extrudate to be immersed in heated vegetable oil. Other forms of heating were investigated and infra-red travelling oven was also found satisfactory.

The resulting heat set extudate may be further cut to size.

It has been found that the final texture and eating quality of the produce may be modified by addition of egg albumen or a protein isolate. These can contribute to the protein structure within the dough modifying the texture. There is also a marked effect on the quality of the heat set. There is also room for manoeuvre with regard to the use of textured vegetable protein. A number of different untextured vegetable proteins have been investigated which can greatly affect the quality of the dough and the final product (see example 2).

The following examples have been produced in accordance with the invention.

Example 1

Gluten (5.0Kg), hydrated textured vegetable protein (15Kg) were added to a Tweedy 70 mixer along with water (6.5l), dried egg albumen (1.0Kg) and sundry spices, flavour and colour. The resulting mix was blended until 10.5 watt h/Kg has been recorded. The resulting dough was extruded through a plate having 5 mm holes into vegetable oil at between 100° and 250° C. preferably 190° C. for 5 seconds. The product was then reduced in size by cutting. The product comprises a minimum protein content of 49% on a moisture and oil free basis, a minimum oil content of 5% and a final moisture content between 15% and 80%.

Example 2

Soya grits (7.0Kg), gluten (4.5Kg), water (16l) were blended in a Hobart dough mixer along with fully hydrated soya protein isolate (4.0Kg) and a preblend of colour, spices and flavour for 35 minutes on high speed. The resulting dough was extruded and heated as per example 1.

Example 3

A twin screw extruder with nominal barrel diameter of 100 mm and with a double length barrel of 21 diameters (2.1 m) and a primary and auxiliary feed port was set up with a ratio of feed inputs of 1.5 to 1 with respect to port 1 and port 2. Port 1 feed consisted of a mixture of gluten 5 parts, dried egg albumen 0.8 parts, spices and flavours 1.2 parts and vegetable oil 1 part. Port 2 feed consisted of hydrated textured vegetable protein. The barrel profile was set up with sufficient mixing and shear sections to obtain an homogenous mixture and impart the necessary energy. The barrel was set up with a temperature gradient of 30 degrees C. to 63 degrees C. in the final 1.0 m. The resulting mass was extruded through a series of 4 holes of 4 mm in diameter with a rotating blade giving final lengths of 5 to 9 mm and deposited onto a travelling oven of 1 m in length to yield a final product temperature on exit of 110 degrees C.

Example 4.

Soya concentrate (5Kg) was hydrated in a high speed mixer for 5 minutes with 2.5 parts water. To this was added gluten (3Kg), textured vegetable protein (0.5Kg), flavours and spices (0.5Kg), water (2l) and the result mixed at high speed in a Mono mixer for 4.5 minutes on maximum speed. The resulting dough was extruded through a mincing plate of 5.2 mm and immersed in hot vegetable oil for 12 seconds.

Although cutting has been referred to the dough may be formed in other ways.

It will be appreciated that the above embodiment has been described by way of example only and that many variations are possible without departing from the scope of the invention.

What is claimed is:

1. A process for the production of a minced product comprising the steps of:
   (a) blending together one or more vegetable proteins, one of which is wheat gluten, and water to produce a mixture;
   (b) imparting 5 to 22 watt hours per kg to the mixture during the blending to produce a sheet structure;
   (c) extruding the sheeted mixture through an aperture having a diameter in the range of 2 mm to 100 mm to form an extrudate;
   (d) setting said extrudate by heating to a temperature of at least 65° C.; and
   (e) cutting said extrudate to size.

2. A process according to claim 1, in which the diameter of the aperture is in the range of 2.0 to 19 mm.

3. A process according to claim 1, in which the diameter of the aperture is in the range of 2.5 to 15 mm.

4. A process according to claim 1, in which the diameter of the aperture is 5 mm.

5. A process according to claim 1, in which the extrudate is heated for 3 to 150 seconds.

6. A process according to claim 1, in which the extrudate is formed to size before or after heating.

7. A process according to claim 1, in which the extrudate is cut to size to a final length of product in the range of 5 to 15 mm.

8. A process according to claim 1, in which the extrudate is heated by using vegetable oil at a temperature in the range of 100° C.–250° C.

9. A process according to claim 1, in which a final temperature of the mixture is less than 75° C.

* * * * *